US010313339B1

(12) United States Patent
Power et al.

(10) Patent No.: US 10,313,339 B1
(45) Date of Patent: Jun. 4, 2019

(54) SECURE ACTIVATION OF AUTHENTICATION DEVICES BASED ON COMMUNICATIONS RECEIVED VIA DESIGNATED COMMUNICATION CHANNELS

(71) Applicant: Amazon Technologies, Inc., Seattle, WA (US)

(72) Inventors: Conor Power, Dublin (IE); Jon Arron McClintock, Seattle, WA (US); Dean H. Saxe, Seattle, WA (US); Tushaar Sethi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 168 days.

(21) Appl. No.: 15/376,494

(22) Filed: Dec. 12, 2016

(51) Int. Cl.
*H04L 29/06* (2006.01)
*H04L 9/32* (2006.01)

(52) U.S. Cl.
CPC ........ *H04L 63/0861* (2013.01); *H04L 9/3247* (2013.01); *H04L 63/0876* (2013.01); *H04L 63/10* (2013.01)

(58) Field of Classification Search
CPC . H04L 63/0861; H04L 63/0876; H04L 63/10; H04L 9/3247
USPC .......................................................... 713/170
See application file for complete search history.

(56) References Cited

U.S. PATENT DOCUMENTS

| 6,529,727 | B1* | 3/2003 | Findikli | H04W 8/265 455/411 |
| 9,198,024 | B1* | 11/2015 | Khalid | H04W 4/20 |
| 2008/0177904 | A1* | 7/2008 | Storey | G06F 9/4411 710/10 |
| 2011/0291814 | A1* | 12/2011 | Faith | G01S 5/0226 340/10.5 |
| 2015/0281235 | A1* | 10/2015 | D'Argenio | H04L 63/10 726/7 |

OTHER PUBLICATIONS

Tuexen et al., "Datagram Transport Layer Security (DTLS) for Stream Control Transmission Protocol (SCTP)," Request for Comments 6083, Jan. 2011, 10 pages.
Turner et al., "Prohibiting Secure Sockets Layer (SSL) Version 2.0," Request for Comments 6176, Mar. 2011, 4 pages.
Atkinson, R., "IP Authentication Header," Request for Comments: 1826, Standards Track, Aug. 1995, 14 pages.
Atkinson, R., "IP Encapsulating Security Payload (ESP)," Request for Comments: 1827, Standards Track, Aug. 1995, 13 pages.
(Continued)

*Primary Examiner* — Michael S McNally
(74) *Attorney, Agent, or Firm* — Davis Wright Tremaine LLP

(57) ABSTRACT

A delivery verification service receives an electronic message that indicates delivery of an authentication device. In response to receiving the electronic message, the delivery verification service identifies, based at least in part on the electronic message, a set of attributes of a recipient to which the authentication device was delivered. Based at least in part on these attributes of the recipient, the delivery verification service determines whether to activate the authentication device. If the delivery verification service determines that the authentication device can be activated, the delivery verification service causes the authentication device to be enabled.

20 Claims, 9 Drawing Sheets

(56) References Cited

OTHER PUBLICATIONS

Atkinson, R., "Security Architecture for the Internet Protocol," Request for Comments: 1825, Standards Track, Aug. 1995, 23 pages.
Blake-Wilson et al., "Elliptic Curve Cryptography (ECC) Cipher Suites for Transport Layer Security (TLS)," Request for Comments: 4492, Informational, May 2006, 35 pages.
Blake-Wilson et al., "Transport Layer Security (TLS) Extensions," Request for Comments: 3546, Standards Track, Jun. 2003, 29 pages.
Blake-Wilson et al., "Transport Layer Security (TLS) Extensions," Request for Comments: 4366, Standards Track, Apr. 2006, 30 pages.
Blumenthal et al., "Pre-Shared Key (PSK) Ciphersuites with NULL Encryption for Transport Layer Security (TLS)," Request for Comments: 4785, Standards Track, Jan. 2007, 5 pages.
Brown et al., "Transport Layer Security (TLS) Authorization Extensions," Request for Comments: 5878, Experimental, May 2010, 19 pages.
Chown, "Advanced Encryption Standard (AES) Ciphersuites for Transport Layer Security (TLS)," Request for comments: 3268, Standards Track, Jun. 2002, 7 pages.
Dierks et al., "The TLS Protocol Version 1.0," Request for Comments 2246, Jan. 1999, 75 pages.
Dierks et al., "The Transport Layer Security (TLS) Protocol Version 1.2," Request for Comments 5246, Standards Track, Aug. 2008, 98 pages.
Eastlake, E., "Transport Layer Security (TLS) Extensions: Extension Definitions," Request for Comments: 6066, Standards Track, Jan. 2011, 25 pages.
Eronen et al., "Pre-Shared Key Ciphersuites for Transport Layer Security (TLS)," Request for Comments 4279, Dec. 2005, 16 pages.
Ford-Hutchinson, "Securing FTP with TLS," Request for Comments: 4217, Standards Track, Oct. 2005, 29 pages.
Friend, "Transport Layer Security (TLS) Protocol Compression Using Lempel-Ziv-Stac (LZS)," Request for Comments: 3943, Informational, Nov. 2004, 13 pages.
Gutmann, "Encrypt-then-MAC for Transport Layer Security (TLS) and Datagram Transport Layer Security (DTLS)," Request for Comments: 7366, Standards Track, Sep. 2014, 7 pages.
Hoffman, "SMTP Service Extension for Secure SMTP over Transport Layer Security," Request for Comments: 3207, Standards Track, Feb. 2002, 9 pages.
Hollenbeck, "Transport Layer Security Protocol Compression Methods," Request for Comments: 3749, Standards Track, May 2004, 8 pages.
Housley, R., "Using Advanced Encryption Standard (AES) CCM Mode With IPsec Encapsulating Security Payload (ESP)," Request for Comments: 4309, Standards Track, Dec. 2005, 14 pages.
Kanno et al., "Addition of the Camellia Cipher Suites to Transport Layer Security (TLS)," Request for Comments: 6367, Informational, Sep. 2011, 8 pages.
Karn, P., et al., "The ESP DES-CBC Transform," Request for Comments: 1829, Standards Track, Aug. 1995, 11 pages.
Kato et al., "Camellia Cipher Suites for TLS," Request for Comments: 5932, Standards Track, Jun. 2010, 6 pages.
Kent, S., "IP Encapsulating Security Payload (ESP)," Request for Comments: 4303, Standards Track, Dec. 2005, 45 pages.
Kent, S., "Security Architecture for the Internet Protocol," Request for Comments: 2401, Standards Track, Nov. 1998, 62 pages.
Kent, S., and K. Seo, "Security Architecture for the Internet Protocol," Request for Comments: 4301, Standards Track, Dec. 2005, 102 pages.

Khare et al., "Upgrading to TLS within HTTP/1.1," Request for Comments: 2817, Standards Track, May 2000, 13 pages.
Kim et al., "Addition of the ARIA Cipher Suites to Transport Layer Security (TLS)," Request for Comments: 6209, Informational, Apr. 2011, 9 pages.
Lee et al., "Addition of SEED Cipher Suites to Transport Layer Security (TLS)," Request for Comments: 4162, Standards Track, Aug. 2005, 6 pages.
Mavrogiannopoulos et al., "Using OpenPGP Keys for Transport Layer Security (TLS) Authentication," Request for Comments: 6091, Informational, Feb. 2011, 9 pages.
Mavrogiannopoulos, "Using OpenPGP Keys for Transport Layer Security (TLS) Authentication," Request for comments: 5081, Experimental, Nov. 2007, 8 pages.
Mcgrew et al., "AES-CCM Cipher Suites for Transport Layer Security (TLS)," Request for Comments: 6655, Standards Track, Jul. 2012, 8 pages.
Mcgrew et al., "Datagram Transport Layer Security (DTLS) Extension to Establish Keys for the Secure Real-time Transport Protocol (SRTP)," Request for Comments 5764, May 2010, 27 pages.
Medvinsky et al., "Addition of Kerberos Cipher Suites to Transport Layer Security (TLS)," Request for Comments: 2712, Standards Track, Oct. 1999, 7 pages.
Merkle et al., "Elliptic Curve Cryptography (ECC) Brainpool Curves for Transport Layer Security (TLS)," Request for Comments: 7027, Informational, Oct. 2013, 10 pages.
Metzger, P., et al., "IP Authentication Using Keyed MD5," Request for Comments: 1828, Standards Track, Aug. 1995, 6 pages.
Moriai et al., "Addition of Camellia Cipher Suites to Transport Layer Security (TLS)," Request for Comments: 4132, Standards Track, Jul. 2005, 7 pages.
Newman, "Using TLS with IMAP, POP3 and ACAP," Request for Comments: 2595, Standards Track, Jun. 1999, 15 pages.
Orman, H., "The OAKLEY Key Determination Protocol," Request for Comments: 2412, Informational, Nov. 1998, 56 pages.
Phelan, "Datagram Transport Layer Security (DTLS) over the Datagram Congestion Control Protocol (DCCP)," Request for Comments 5238, May 2008, 11 pages.
Rescorla et al., "Datagram Transport Layer Security Version 1.2," Request for Comments 6347, Jan. 2012, 33 pages.
Rescorla et al., "Datagram Transport Layer Security," Request for Comments: 4347, Standards Track, Apr. 2006, 25 pages.
Rescorla et al., "Transport Layer Security (TLS) Renegotiation Indication Extension," Request for Comments: 5746, Standards Track, Feb. 2010, 15 pages.
Rescorla, "HTTP Over TLS," Request for Comments: 2818, Informational, May 2000, 7 pages.
Rescorla, "TLS Elliptic Curve Cipher Suites with SHA-256/384 and AES Galois Counter Mode (GCM)," Request for Comments: 5289, Informational, Aug. 2008, 6 pages.
Salowey et al., "Transport Layer Security (TLS) Session Resumption without Server-Side State," Request for Comments: 5077, Standards Track, Jan. 2008, 20 pages.
Salowey, "AES Galois Counter Mode (GCM) Cipher Suites for TLS," Request for Comments: 5288, Standards Track, Aug. 2008, 8 pages.
Salter et al., "Suite B Profile for Transport Layer Security (TLS)," Request for Comments: 6460, Informational, Jan. 2012, 14 pages.
Santesson et al., "TLS User Mapping Extension," Request for Comments: 4681, Standards Track, Oct. 2006, 11 pages.
Santesson, "TLS Handshake Message for Supplemental Data," Request for Comments: 4680, Standards Track, Sep. 2006, 9 pages.
Taylor et al., "Using the Secure Remote Password (SRP) Protocol for TLS Authentication," Request for Comments: 5054, Informational, Nov. 2007, 24 pages.

\* cited by examiner

SECURE ACTIVATION OF AUTHENTICATION DEVICES BASED ON COMMUNICATIONS RECEIVED VIA DESIGNATED COMMUNICATION CHANNELS

BACKGROUND

Advances in computer networking have enabled robust communications over large distances which, in turn, have changed the ways certain activities have traditionally been accomplished. Organizations, for example, often rely on employees and other entities in remote locations to perform various tasks in support of these organizations. While the ability to work and otherwise engage with an organization remotely creates numerous possibilities, it also introduces additional risks that require additional resources to address. For example, over large distances, it is difficult to ensure that a person communicating over a network is the person they say they are. While various techniques for authentication can alleviate some of the concerns, the setup and configuration of various authentication schemes can still be difficult when performed over a network. Such setup and configuration, for example, may involve significant care and resources to ensure that the person for whom authentication is being set up is the correct person and not someone without authorization seeking to obtain the ability gain unauthorized access to a network.

BRIEF DESCRIPTION OF THE DRAWINGS

Various techniques will be described with reference to the drawings, in which.

DETAILED DESCRIPTION

Figure 1:
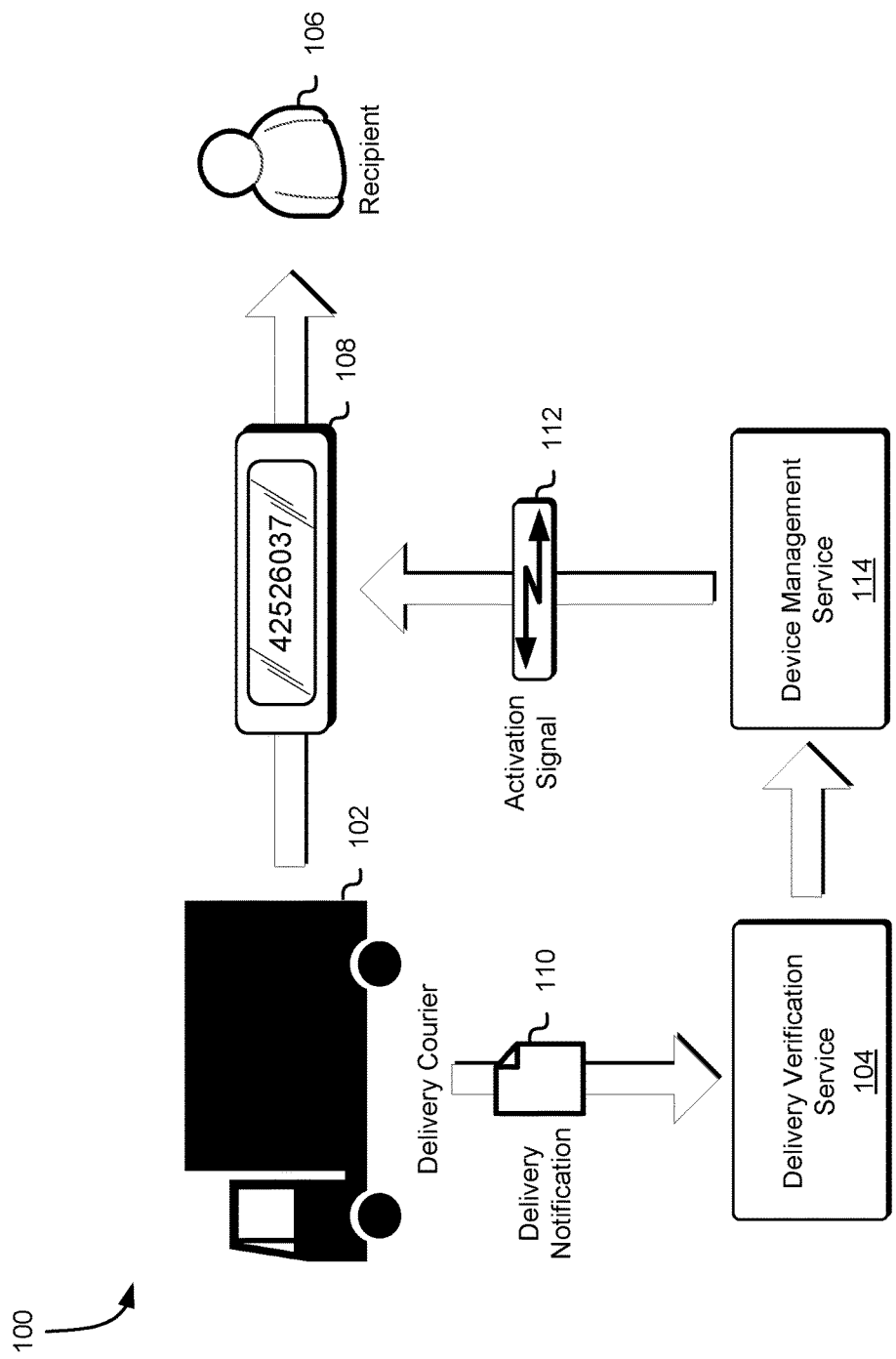
FIG. 1 shows an illustrative example of an environment in which various embodiments can be implemented.

This patent application relates to using delivery notifications regarding delivery of an authentication device to an intended recipient to determine whether to cause the authentication device to be activated for use by the intended recipient. In an example, an organization utilizes a delivery courier to deliver an authentication device to an intended recipient, which can use the authentication device to access the organization's services and resources. The authentication device may be inactive to prevent unauthorized use of the authentication device if the authentication device is intercepted or lost during delivery and may require an activation signal in order to activate the authentication device. The delivery courier may have a trusted relationship with the organization. For instance, in an example, the organization provides a secure communications channel through which the delivery courier may transmit communications to the organization during delivery cycles. As part of delivery of the authentication device, the delivery courier may provide a delivery notification to a delivery verification service of the organization. The delivery notification may specify the date and time of delivery of the authentication device, as well as the location of the delivery and information regarding the entity that received the authentication device (e.g., signature, name, biometric information, etc.). The delivery verification service may evaluate the delivery notification from the delivery courier to identify the recipient's characteristics, which the delivery verification service may use to determine whether the recipient is authorized to utilize the authentication device. If so, the delivery verification service may transmit a notification to a device management service to indicate that activation of the authentication device is permitted.

In some examples, the delivery courier will deliver the authentication device to an entity other than the intended recipient that is authorized to utilize the authentication device. The intended recipient may provide, to this other entity, a unique code that may be provided to the delivery courier to indicate that it is authorized to receive the authentication device on the intended recipient's behalf. The unique code may be generated by the intended recipient and provided to the delivery verification service or it may be generated by the delivery verification service and provided to the intended recipient as part of an initial registration process for obtaining the authentication device. The delivery courier may include the unique code in the delivery notification that is transmitted to the delivery verification service. In response to receiving the delivery notification from the delivery courier, the delivery verification service may determine whether the other entity that received the authentication device was authorized to receive the authentication device on behalf of the intended recipient. This may include verifying the unique code provided in the delivery notification to determine whether the code is valid. In an example, if the unique code is valid, the delivery verification service will await a request from the intended recipient to activate the authentication device. However, if the unique code provided in the delivery notification is not valid, the delivery verification service may prevent activation of the authentication device.

If the authentication device is received by an authorized entity other than the intended recipient, the intended recipient may be given a limited amount of time to activate the authentication device. For instance, in an example, the intended recipient will access the delivery verification service to request activation of the authentication device. If the delivery verification service determines that the authentication device has expired (e.g., the time between delivery and the request to activate is greater than an activation period for the device), the delivery verification service may deny the request and prevent activation of the authentication device. However, if the activation period for the authentication device has not expired, the delivery verification service may evaluate the request to determine whether the request is from the intended recipient and that the intended recipient is authorized to use the authentication device. The delivery verification service may transmit a notification to a device management service for authentication devices to indicate that activation of the authentication device is permitted if the request is from an authorized recipient of the authentication device and the activation period for the device has not expired.

In an example, the device management service receives the notification for activation of the authentication device from the delivery verification service and determines whether the notification indicates that the authentication device can be activated. For instance, the notification may specify an electronic address of the authentication device that is to be activated or other information that may be used to identify the authentication device. Additionally, the notification may specify the elements of the authentication device that may require activation in order to enable the recipient to utilize the authentication device to access the organization's services and resources. Based on the information specified in the notification, the device management service may transmit an activation signal to the specified authentication device to cause the authentication device to be activated for use. If the authentication device is activated successfully, the recipient may utilize the authentication device for authentication purposes in accessing the organization's services and resources.

In this manner, a delivery verification service of an organization may utilize delivery notifications from trusted delivery couriers to determine whether to activate authentication devices delivered to authorized recipients. In addition, the techniques described and suggested in this disclosure enable additional technical advantages. For instance, because the delivery verification service may impose an activation period for an authentication device delivered to an entity other than the intended recipient, the delivery verification service may prevent activation of the authentication device if it is lost or intercepted by another entity. Further, because the intended recipient may need to access the delivery verification service to request activation of the authentication device prior to expiration of the activation period, the delivery verification service may verify that the intended recipient is authorized to use the authentication device prior to activation of the authentication device.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which various embodiments can be implemented. In the environment 100, a delivery courier 102 delivers, on behalf of an organization that relies on multi-factor authentication or other authentication schemes, an authentication device 108 that can be used by a recipient 106 to access one or more services and resources of the organization. The organization may be a computing resource service provider that provides one or more services such as a virtual computer system service, object-based data storage services, database services, a policy management service, as well as a plurality of other services for the creation and management of resources and to support operational needs. The recipient 106 may be an individual, a group of individuals, or other organization that can utilize one or more services and resources provided by the organization to operate and manage computing resources to support his or her operations. Additionally, the recipient 106 may be an employee of the organization which may be granted access to the one or more services and resources as part of its employment arrangement with the organization.

The delivery courier 102 may be an individual, group of individuals, automated device, or other entity responsible for the exchange of items between two or more parties. The delivery courier 102 may be part of a delivery service that is contracted by the organization to deliver its authentication devices and other items associated with the organization to one or more recipients. In some instances, the delivery service may be vetted by the organization to ensure that the delivery service and its delivery couriers can be trusted with delivery of the authentication devices and other items on behalf of the organization. Alternatively, the delivery courier 102 may be an employee or other entity associated with the organization. In an embodiment, if a delivery service has been vetted by the organization, the organization may grant the delivery service and its delivery couriers access to a delivery verification service 104 provided by the organization or other entity associated with the organization, such as a computing resource service provider or other service provider. The delivery verification service 104 may enable a delivery courier 102 to provide a delivery notification 110 regarding delivery of an authentication device 108 to an intended recipient 106, as described in more detail below.

The authentication device 108 sent to the recipient 106 by the organization and delivered by the delivery courier 102 may comprise one or more hardware components that may be configured to collectively obtain and display one-time passwords. Accordingly, the authentication device 108 may comprise a device display unit that may display these one-time passwords or other authentication information that the recipient 106 may provide to the organization to access its services and resources. The authentication device 108 may communicate, such as through one or more communications networks (e.g., the Internet), with a device management service 114 to obtain a new one-time password after a specified period of time. Alternatively, the authentication device 108 may be configured to utilize one or more mathematical algorithms after a period of time to generate a new one-time password or other authentication information. The display of this unique password may be pursuant to tamper-proof circuitry that may be included in the authentication device 108. For instance, if an entity attempts to modify the authentication device 108, such as re-writing one or more executable instructions stored within the authentication device 108, the authentication device 108 may no longer display unique passwords or one-time passwords. While authentication devices are used throughout the present disclosure for the purpose of illustration, other devices that can be authenticated are covered within the scope of the present disclosure. For instance, a consumer device that requires authentication of a recipient 106 prior to use may be activated if the delivery notification 110 can be used to determine that the recipient 106 received the device.

In some embodiments, the authentication device 108 generates new one-time passwords itself, through use of a hardware component of the authentication device 108 that utilizes information (e.g., a seed value) that enables it to verify authentication attempts made using one-time passwords or other codes. The authentication device 108 may be configured without any communications components, making it unable to communicate with the device management service 114. If the delivery verification service 104 determines, based at least in part on the delivery notification 110, that the authentication device 108 may be activated, the delivery verification service 104 may transmit a notification to the device management service 114 that specifies an identifier of the authentication device 108 delivered to the recipient 106. The device management service 114, in response to the notification, may register the authentication device 108 in a database to enable the authentication device 108 to be used by the recipient 106 for authentication. For instance, the device management service 114 may maintain information (e.g., a seed value) that enables it to verify authentication attempts made using one-time passwords or other codes generated by the authentication device 108. Thus, the device management service 114 may generate the one-time password displayed on the authentication device 108 for authentication purposes.

In an embodiment, the authentication device 108 is delivered to the recipient 106 by the delivery courier 102 in a deactivated state such that the authentication device 108 cannot be used for authentication purposes until it has been activated by a device management service 114. For instance, the authentication device 108 may not be associated with a recipient account until activated by the device management service 114 and, thus, may not be used for authentication purposes. Alternatively, the authentication device 108 may be a standby or low-power state whereby the authentication device 108 may not provide one-time passwords or other authentication information until an activation signal is received. The delivery courier 102 may request that the recipient 106 provide identification information to the delivery courier 102 that can be included in a delivery notification 110 to the delivery verification service 104. For instance, the recipient 106 may provide its printed name, signature, biometric information, credential information, and the like to the delivery courier 102 to acknowledge delivery of the authentication device 108. In response to obtaining the identification information from the recipient 106, the delivery courier 102 may generate the delivery notification 110, which may include the provided identification information and other information that may be used by the delivery verification service 104 to determine whether the authentication device 108 was delivered to the intended recipient 106. For instance, the delivery notification 110 may specify the time and date of delivery, the address to which the authentication device 108 was delivered, the identification information for the recipient 106, and the like.

The delivery courier 102 may access the delivery verification service 104 via an encrypted communications channel that may be established between the delivery courier 102 and the delivery verification service 104. The delivery courier 102 may utilize a computing device to establish the communications channel and access the delivery verification service 104. Generally, embodiments of the present disclosure may use various protocols, such as a Secure Sockets Layer (SSL) or Transport Layer Security (TLS) protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366 which are incorporated herein by reference, to establish encrypted communications channels. Other protocols implemented below the application layer of the Open Systems Interconnect (OSI) model may also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, Internet Protocol Security (e.g., as defined in RFC 1825 through 1829, RFC 2401, RFC 2412, RFC 4301, RFC 4309, and RFC 4303), and other protocols, such as protocols for secure communication that include a handshake.

The delivery courier 102 may transmit, over the encrypted communications channel, the delivery notification 110 to the delivery verification service 104. In response to receiving the delivery notification 110 from the delivery courier 102, the delivery verification service 104 may evaluate the delivery notification 110 to identify the recipient's identification information and other characteristics that may be used to determine whether the authentication device 108 was delivered to the intended recipient 106. For instance, in order to request delivery of the authentication device 108, the recipient 106 may provide its name, address, biometric information, pre-shared secret, unique facts known by the recipient 106 and the sender (e.g., purchase history, places visited, responses to questions, etc.), items owned by the recipient 106 (e.g., Internet of Things devices connected to the sender's network), and the like to the organization in order to enable the organization to authenticate the recipient 106. Generally, the recipient 106 may provide information indicating something s/he knows, something s/he has (e.g., a combination of Internet of Things devices that are associated with the recipient), and/or something the person is (e.g., biometric data). In some examples, the recipient provides information according to specific instructions, such as by interacting with an Internet of Things or other device in a specific way (e.g., pressing a button a number of times that causes a network communication to be sent out, or interacting with a network-connected thermostat). The organization may provide this information to the delivery verification service 104, which may compare this information to the identification information specified in the delivery notification 110. If the delivery verification service 104 determines that the identification information specified in the delivery notification 110 corresponds to the intended recipient 106, the delivery verification service 104 may determine that the authentication device 108 was successfully delivered to the intended recipient 106. Further, the delivery verification service 104 may transmit a notification to the device management service 114 to indicate that the authentication device 108 may be activated for use by the intended recipient 106.

In an embodiment, the device management service 114 stores the notification from the delivery verification service 104 while awaiting a request from the recipient 106 to activate the authentication device 108. The recipient 106 may transmit a request to the device management service 114 to activate the authentication device 108. In response to the request, the device management service 114 may determine whether it has received a notification from the delivery verification service 104 indicating that the authentication device 108 specified by the recipient 106 in its request can be activated. If the device management service 114 determines that the authentication device 108 may be activated, the device management service 114 may transmit an activation signal 112 to the authentication device 108 to activate the authentication device 108. The activation signal 112 may include executable instructions that may cause the authentication device 108 to initiate generation and presentation of one-time passwords or other authentication information that the recipient 106 may utilize as part of an authentication process for accessing one or more services or resources of the organization. Alternatively, the activation signal 112 may cause the authentication device 108 to establish a secure communications channel with the device management service 114 to obtain the authentication information that may be presented to the recipient 106. In some embodiments, the notification indicating that the authentication device 108 can be activated is subject to an activation period within which the recipient 106 is to transmit a request for activation of the authentication device 108. For instance, if the recipient 106 submits a request to the device management service 114 to activate the authentication device 108, and the activation period has expired, the device management service 114 may deny the request. Additionally, the device management service 114 may transmit a signal to the authentication device 108 that may cause the authentication device 108 to cease function.

In an embodiment, the authentication device 108 is delivered to the recipient 106 in a state whereby the authentication device 108 cannot be used to transmit and receive signals from other sources, including the device management service 114. The recipient 106 may change the state of the authentication device 108 by interacting with the authentication device 108 to enable signal transmission and delivery to the authentication device 108. If the recipient 106 interacts with the authentication device 108 to change its initial state, the authentication device 108 may transmit a signal to the device management service 114 to activate the authentication device 108. In response to the signal, the device management service 114 may determine whether it has received a notification from the delivery verification service 104 indicating that the authentication device 108 may be activated. If the device management service 114 determines that the authentication device 108 may be activated, the device management service 114 may transmit the activation signal 112 to the authentication device 108 to activate the authentication device 108.

Figure 2:
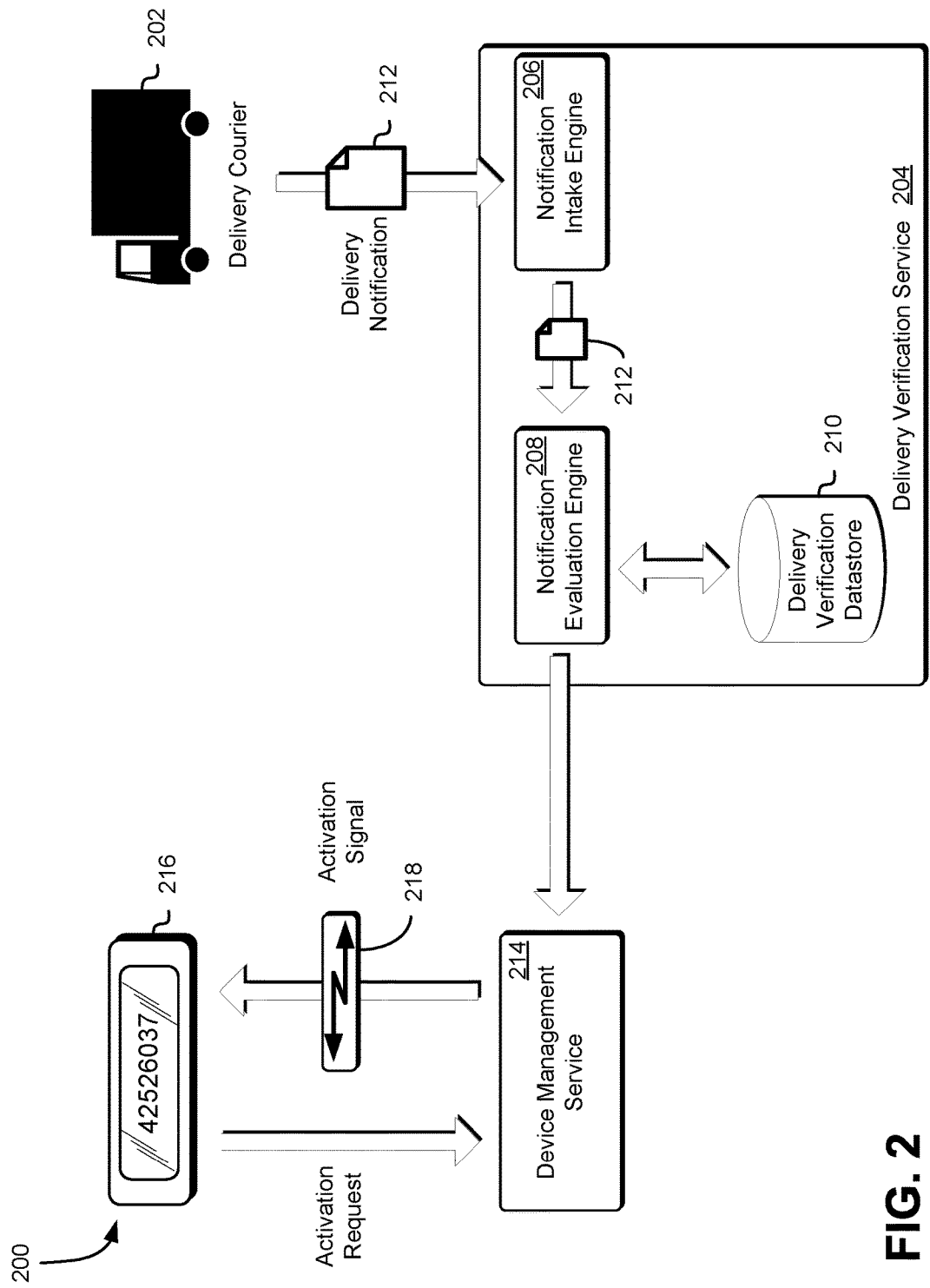
FIG. 2 shows an illustrative example of an environment in which a delivery verification causes a device management service to transmit an activation signal to an authentication device in response to receiving a delivery notification for the authentication device in accordance with at least one embodiment.

As noted above, an organization may utilize a delivery courier to deliver an authentication device to a recipient for use in accessing one or more services and resources provided by the organization. The organization, through a delivery verification service, may utilize a delivery notification from the delivery courier to determine whether the authentication device has been delivered to the intended recipient or to an authorized entity as designated by the intended recipient. If the delivery verification service determines that the authentication device was delivered successfully to the intended recipient or other authorized entity, the delivery verification service may transmit a notification to a device management service to indicate that the authentication device may be activated. Accordingly, FIG. 2 shows an illustrative example of an environment 200 in which a delivery verification service 204 causes a device management service 214 to transmit an activation signal 218 to an authentication device 216 in response to receiving a delivery notification 212 for the authentication device 216 in accordance with at least one embodiment.

In the environment 200, a delivery courier 202 may transmit a delivery notification 212 to a delivery verification service 204. The delivery notification 212 may specify identification information provided by a recipient of the authentication device 216 sent by an organization to an intended recipient. For instance, the delivery notification 212 may specify the name of the recipient that accepted the authentication device 216, a signature for the recipient, a unique code if received by a recipient other than the intended recipient, and the like. The delivery notification 212 may further include other information that may be used by the delivery verification service 204 to determine whether the authentication device 216 was delivered to the intended recipient. For instance, the delivery notification 212 may specify the address at which the delivery of the authentication device 216 was made, a tracking number that may have been generated by the delivery courier 202 upon receipt of the authentication device 216 for delivery, the name of the delivery courier 202, environmental conditions and/or observations at the delivery site detected via calibrated sensors of a device utilized by the delivery courier 202 (e.g., characteristic ambient sounds, temperature, elevation, humidity, olfactory characteristics, and/or combinations of such characteristic measurements, etc.) and the like. In some embodiments, the delivery verification service 204 or the device management service 214 causes a device under its control or that it has access to generate a unique environmental condition (e.g., change opacity of lights at the delivery site, emit a particular sound at varying frequencies, lights to flicker in a certain manner, etc.). This condition may be detected by the delivery courier 202 or a device utilized by the delivery courier 202, which may include characteristics of the condition in the delivery notification 212.

The delivery verification service 204 may receive the delivery notification 212 from the delivery courier 202 through a notification intake engine 206. The notification intake engine 206 may include one or more computer systems that establish communications channels with deliver couriers to enable delivery couriers to provide any delivery notifications corresponding to the delivery of authentication devices on behalf of the organization to the delivery verification service 204. In response to receiving a delivery notification 212 from a delivery courier 202, the notification intake engine 206 may transmit the delivery notification 212 to a notification evaluation engine 208. The notification evaluation engine 208 may include one or more computer systems of the delivery verification service 204 that processes incoming delivery notifications 212 to determine whether delivery of the authentication device 216 or other item was successfully made to the intended recipient or to another authorized recipient as designated by the intended recipient or the organization.

The notification evaluation engine 208 may evaluate the delivery notification 212 to identify any recipient characteristics that may be used to determine whether the authentication device 216 was delivered to the intended recipient, an authorized subsidiary recipient designated by the intended recipient or the organization, or to an unauthorized entity. For instance, the notification evaluation engine 208 may access a delivery verification datastore 210, which may include recipient profiles for each intended recipient. A recipient profile may include various characteristics of the recipient, including the recipient's name, signature, biometric information, any delegated entities that may receive deliveries on its behalf, unique codes provided to these delegated entities, known addresses, and the like. If the delivery notification 212 indicates that the authentication device 216 was delivered to an incorrect address or was received by an unauthorized entity, the notification evaluation engine 208 may prevent activation of the authentication device 216. This may include transmitting a notification to the device management service 214 to cause the device management service 214 to transmit a signal to the authentication device 216 to disable the authentication device 216.

In some instances, rather than disabling the authentication device 216, the notification evaluation engine 208 may allow certain functionality (e.g., operations not classified as sensitive) of the authentication device 216 while preventing functionality of the authentication device 216 corresponding to sensitive operations (e.g., authentication of the user of the authentication device 216, generating one-time passwords, etc.). In other embodiments, if the notification evaluation engine 208 determines that the authentication device 216 was delivered to an unauthorized entity, the notification evaluation engine 208 transmits a notification to the device management service 214 to activate the authentication device 216 in a manner that would result in communications being made between the authentication device 216 and a monitoring service, that may serve as a honeypot (e.g., software and hardware resources that are intended detect, deflect, or counteract attempts at unauthorized use of information systems). The authentication device 216 may thus interact with this monitoring service, which may obtain information regarding the unauthorized user.

In some embodiments, if the authentication device 216 is received by an entity other than the intended recipient, the notification evaluation engine 208 determines an activation period for the authentication device 216 during which the authentication device 216 may be activated. If the activation period elapses, the notification evaluation engine 208 may transmit a notification to the device management service 214 to disable the authentication device 216. The activation period may be determined based at least in part on one or more factors. For instance, if the authentication device 216 was delivered to an incorrect address or to an unauthorized recipient, the notification evaluation engine 208 may define a shortened activation period or automatically cause the authentication device 216 to be disabled. Alternatively, if the authentication device 216 was delivered to the correct address but was either received by an authorized entity (e.g., apartment manager, spouse of the intended recipient, etc.) or was left at the address without signature, the notification evaluation engine 208 may define a longer activation period for the authentication device 216.

The authentication device 216 may be delivered in a state whereby the authentication device 216 cannot be used to transmit and receive signals from other sources, including the device management service 214. If so, the notification evaluation engine 208 may transmit a notification to the device management service 214 to indicate whether activation of the authentication device 216 is permitted. For instance, the notification may specify an identifier for the authentication device 216 and other information that may be used to discern signals from the authentication device 216 from other signals for other devices that may be received by the device management service 214. If a recipient of the authentication device 216 utilizes the authentication device 216, thereby changing the state of the authentication device 216, the authentication device 216 may transmit an activation request to the device management service 214. The activation request may specify an identifier for the authentication device 216, as well as other information that may be used to identify the authentication device 216.

In response to the request from the authentication device 216, the device management service 214 may determine whether it has received a notification from the delivery verification service 204 indicating whether the authentication device 216 may be activated. If the notification specifies an activation period for the authentication device 216, the device management service 214 may determine whether the activation period has elapsed. If so, the device management service 214 may prevent activation of the authentication device 216. For instance, this may include transmitting a signal to the authentication device 216 that may cause the authentication device 216 to become disabled for use (e.g., activating electrical fuses or other components of the authentication device 216 to prevent communication among components of the authentication device 216, etc.). If the activation period has not elapsed and the notification from the notification evaluation engine 208 specifies that the authentication device 216 may be activated, the device management service 214 may transmit an activation signal 218 to the authentication device 216 or to another device within proximity of the authentication device 216 (e.g., a relay device, etc.) to activate the authentication device 216.

In an embodiment, if the authentication device 216 is configured without any communications components, the device management service 214 associates the authentication device 216 with the recipient, making the authentication device 216 usable by the recipient for authentication purposes. The device management service 214 may maintain a database of activated authentication devices. Within this database, the device management service 214 may add an identifier for the authentication device 216 and associate this identifier with the recipient. Further, the device management service 214 may maintain information that enables it to verify authentication attempts made using one-time passwords or other codes generated by the authentication device 216. This enables the device management service 214 to calculate the expected one-time password for authentication of the recipient if the recipient provides a one-time password purportedly generated by the authentication device 216. In some embodiments, if the device management service 214 registers an authentication device 214 as being activated for use by the recipient, the device management service 214 identifies other authentication devices utilized by the recipient and deactivates these other authentication devices. Thus, the authentication device 216 and no other older authentication device may be used by the recipient for authentication purposes.

Figure 3:
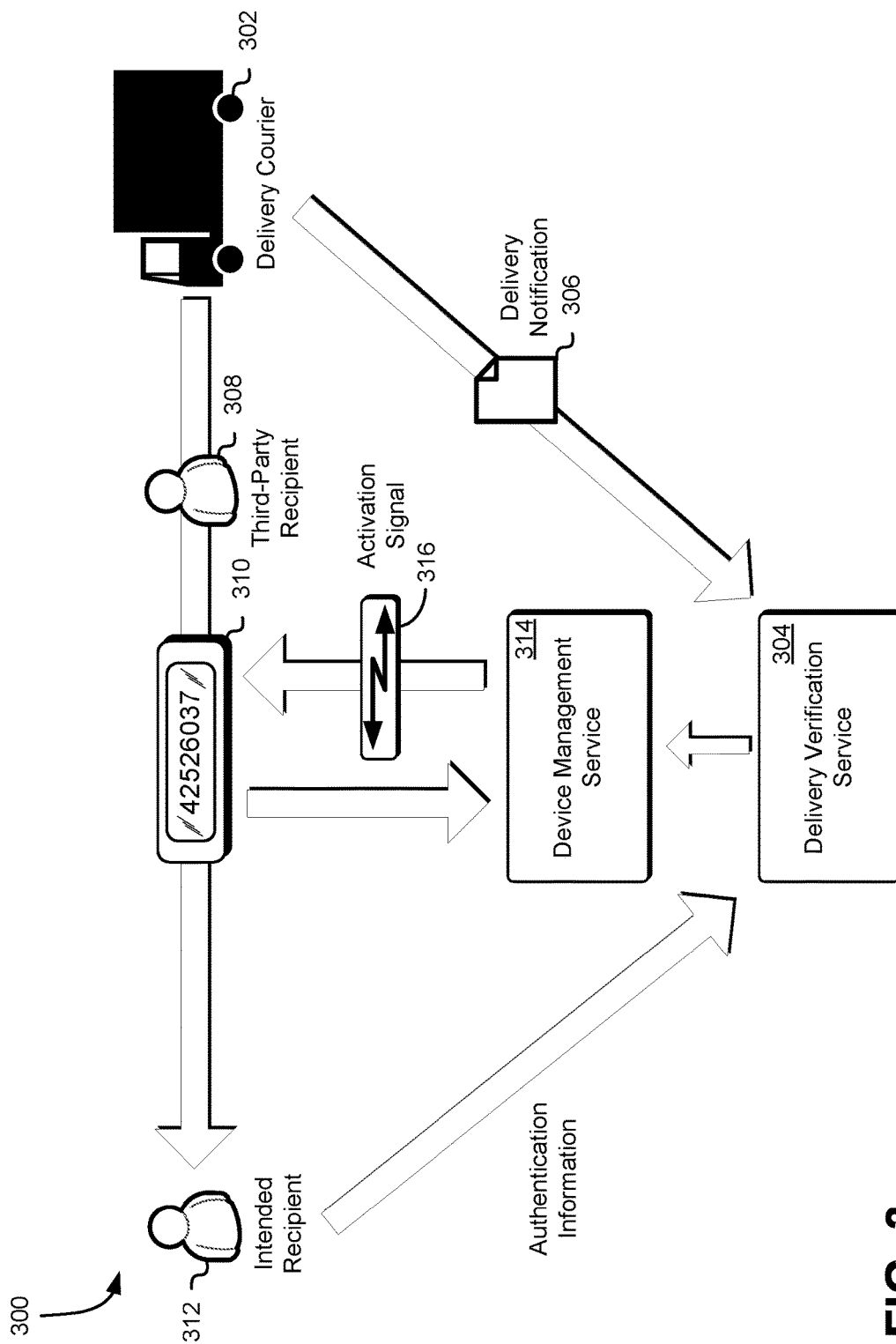
FIG. 3 shows an illustrative example of an environment in which a delivery verification service causes a device management service to transmit an activation signal to an authentication device in response to receiving a delivery notification corresponding to a third-party recipient and to receiving authentication information from a recipient of the authentication device in accordance with at least one embodiment.

As noted above, a delivery courier may deliver an authentication device on behalf of an organization to a third-party recipient that may or may not be associated with the intended recipient of the authentication device. If the authentication device is received by a third-party recipient, the delivery verification service may initiate an activation period for the authentication device during which the intended recipient may need to access the delivery verification service to confirm that it is in possession of the authentication device. Further, the intended recipient may utilize the authentication device during the activation period to activate the authentication device. Accordingly, FIG. 3 shows an illustrative example of an environment 300 in which a delivery verification service 304 causes a device management service 314 to transmit an activation signal 316 to an authentication device 310 in response to receiving a delivery notification 306 corresponding to a third-party recipient 308 and to receiving authentication information from a recipient 312 of the authentication device 310 in accordance with at least one embodiment.

In the environment 300, the delivery courier 302 may deliver an authentication device 310 intended for an intended recipient 312 to a third-party recipient 308. The delivery to the third-party recipient 308 may be made in error. For instance, the delivery courier 302 may deliver the authentication device 310 to an incorrect address or to an entity that shares a name with the intended recipient 312 but is not the intended recipient 312. Alternatively, the delivery courier 302 may deliver the authentication device 310 to a third-party recipient 308 designated by the intended recipient 312 or the organization sending the authentication device 310 as being authorized to receive the authentication device 310 on behalf of the intended recipient 312. Such a third-party recipient 308 may be a housing manager, relative of the intended recipient 312, other employee of the organization that may work with the intended recipient 312, and the like. The delivery courier 302 may obtain recipient information corresponding to the third-party recipient 308 from the third-party recipient 308. This may include the third-party recipient's name, signature, and biometric information that may be used to identify the third-party recipient 308.

In an embodiment, the intended recipient 312 provides a unique code to the third-party recipient 308 which the third-party recipient 308 can provide to the delivery courier 302 upon delivery of the authentication device 310. The intended recipient 312 may register the unique code with the delivery verification service 304 to enable authentication of the third-party recipient 308. Additionally, or alternatively, the intended recipient 312 may provide the delivery verification service 304 with recipient information for the third-party recipient 308. This may include the third-party recipient's name, signature, biometric information, and any other information that may be used by the delivery verification service 304 to authenticate the third-party recipient 308. Thus, the third-party recipient 308 may provide its unique code and other recipient information to the delivery courier 302 in response to receiving the authentication device 310 from the delivery courier 302. At any time, the third-party recipient 308 may provide the authentication device 310 to the intended recipient 312.

The delivery courier 302 may transmit, to the delivery verification service 304, a delivery notification 306 that includes recipient information for the third-party recipient 308. The delivery notification 306 may include the unique code provided by the third-party recipient 308 to the delivery courier 302, as well as other information that may be used to authenticate the third-party recipient 308. The delivery verification service 304 may evaluate the delivery notification 306 from the delivery courier 302 to identify characteristics of the third-party recipient 308 that can be used to authenticate the third-party recipient 308. This may include obtaining the unique code, the third-party recipient's name, signature, biometric information, and other information specified in the delivery notification 306. The delivery verification service 304 may evaluate the provided unique code to determine whether it matches the unique code provided by the intended recipient 312 to the delivery verification service 304 as part of the process to designate a third-party recipient 308 as an authorized recipient of the authentication device 310. Additionally, the delivery verification service 304 may use the identified third-party recipient characteristics to determine whether these characteristics correspond to a third-party recipient 308 designated by the intended recipient 312 as being authorized to receive the authentication device 310 on its behalf.

If the delivery verification service 304 determines that the third-party recipient 308 is not authorized to receive the authentication device 310, the delivery verification service 304 may transmit a notification to the device management service 314 to cause the device management service 314 to transmit a signal to the authentication device 310 to disable the authentication device 310. Additionally, the delivery verification service 304 may transmit a notification to the intended recipient 312 to indicate that the authentication device 310 has been intercepted by an unauthorized third-party recipient. In some embodiments, the delivery verification service 304 defines a shortened activation period for the authentication device 310 if it is received by an unauthorized third-party recipient 308. This may provide the intended recipient 312 a limited amount of time to retrieve the authentication device 310 and submit a request to activate the authentication device 310 as described below. If the activation period elapses, the delivery verification service 304 may transmit a notification to the device management service 314 that may cause the device management service 314 to disable the authentication device 310.

In an embodiment, if the delivery verification service 304 determines, based at least in part on the delivery notification 306 from the delivery courier 302, that the third-party recipient 308 is authorized to receive the authentication device 310 on behalf of the intended recipient 312, the delivery verification service 304 defines an activation period for the authentication device 310 during which the intended recipient 312 may provide authentication information to the delivery verification service 304 to indicate that it has received the authentication device 310. This activation period may be longer than the activation period described above defined as a result of the authentication device 310 having been received by an unauthorized third-party recipient. If the activation period has elapsed without the delivery verification service 304 having received an indication that the intended recipient 312 has received the authentication device 310, the delivery verification service 304 may transmit a notification to the device management service 314 that may cause the device management service 314 to disable the authentication device 310. However, if the intended recipient 312 provides authentication information to the delivery verification service 304 indicating that the intended recipient 312 has received the authentication device 310, the delivery verification service 304 may transmit a notification to the device management service 314 to indicate that the device management service 314 is permitted to activate the authentication device 310. The authentication information from the intended recipient 312 may include credential information for the intended recipient 312, an identifier for the authentication device 310, biometric information of the intended recipient 312, and other information that may be used by the delivery verification service 304 to determine whether the intended recipient 312 is in possession of the authentication device 310.

If the authentication device 310 is delivered in a state whereby the authentication device 310 cannot be used to transmit and receive signals from other sources, the intended recipient 312 of the authentication device 310 may use the authentication device 310 to change the state of the authentication device 310. This may cause the authentication device 310 to transmit an activation request to the device management service 314. In response to the request from the authentication device 310, the device management service 314 may determine whether it has received a notification from the delivery verification service 304 indicating whether the authentication device 310 may be activated. If the notification specifies an activation period for the authentication device 310, the device management service 314 may determine whether the activation period has elapsed. If so, the device management service 314 may prevent activation of the authentication device 310. If the activation period has not elapsed and the notification from the delivery verification service 304 specifies that the authentication device 310 may be activated, the device management service 314 may transmit an activation signal 316 to the authentication device 310 to activate the authentication device 310.

In an embodiment, the third-party recipient 308 is a physical storage location whereby a delivery courier 302 can deposit the authentication device 310. The physical storage location may be connected to the delivery verification service 304 via a communications network. In order to access the physical storage location, the recipient 312 may provide a particular code, which may be provided to the recipient 312 by the delivery verification service 304 or other entity when requesting delivery of an authentication device 310. If the code is used to access the physical storage location to receive the authentication device 310, the physical storage location may transmit a delivery notification to the delivery verification service 304 that specifies an identifier for the physical storage location and the code utilized to access the physical storage location. The delivery verification service 304 may determine whether the code utilized is valid to ensure that the physical storage location was not accessed through alternate methods (e.g., hacking of a terminal at the physical storage location, forced entry, etc.). In some embodiments, if the code is used to access the physical storage location, the physical storage location may obtain biometric information of the individual obtaining the authentication device 310. The physical storage location may transmit this biometric information along with the delivery notification to the delivery verification service 304. The delivery verification service 304 may use the biometric information to determine whether the intended recipient 312 obtained the authentication device 310 from the physical storage location. If another entity obtained the authentication device 310, the delivery verification service 304 may implement the validation period for the authentication device 310 or otherwise transmit a notification to the device management service 314 to prevent activation of the authentication device 310. If the authentication device 310 is obtained by the intended recipient 312 or another authorized recipient, the delivery verification service 304 may await authentication information from the intended recipient 312 for activating the authentication device 310.

Figure 4:
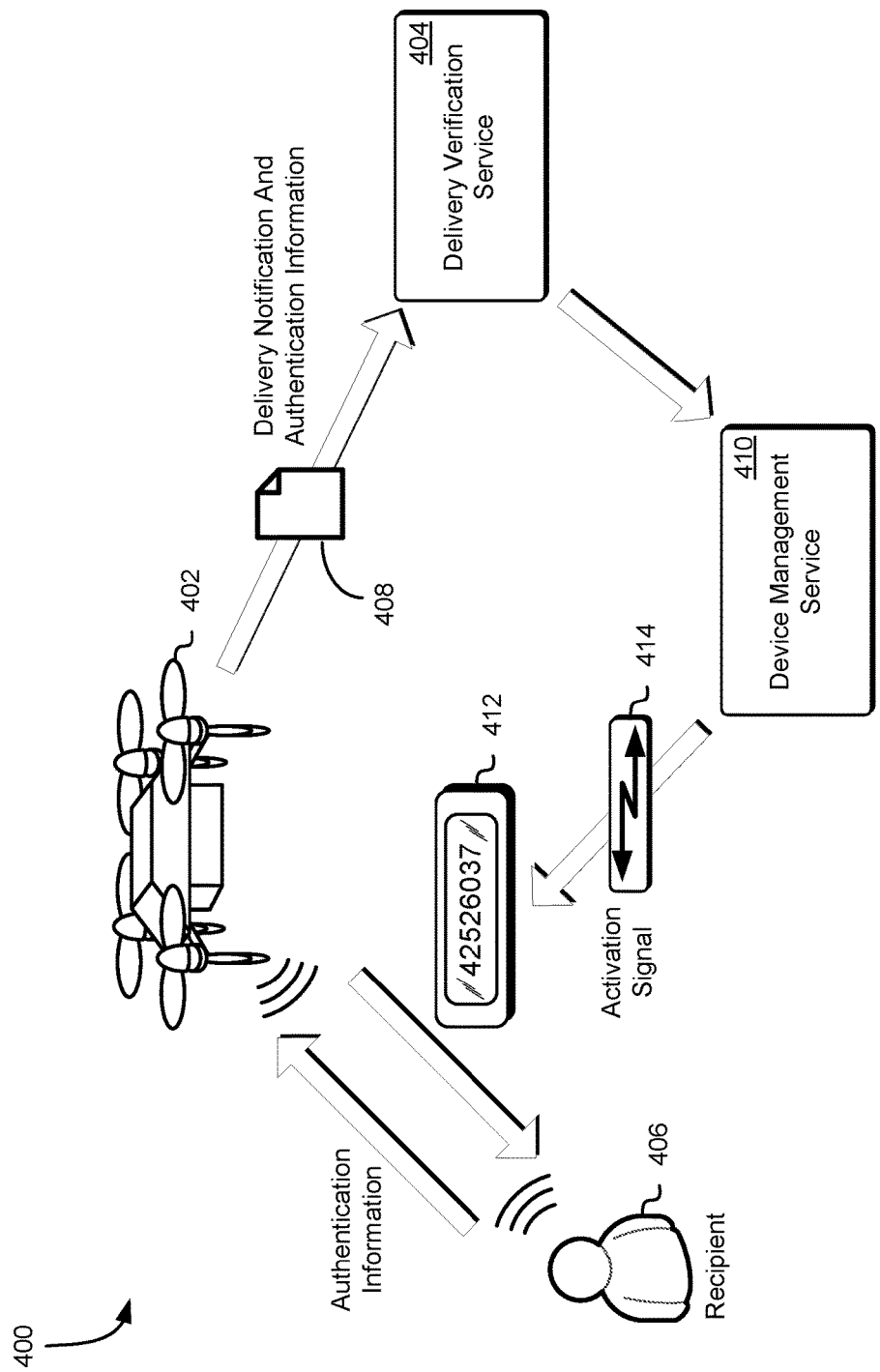
FIG. 4 shows an illustrative example of an environment in which a delivery verification service causes a device management service to transmit an activation signal to an authentication device in response to receiving a delivery notification from an unmanned vehicle in accordance with at least one embodiment.

FIG. 4 shows an illustrative example of an environment 400 in which a delivery verification service 404 causes a device management service 410 to transmit an activation signal 414 to an authentication device 412 in response to receiving a delivery notification 408 from an unmanned vehicle 402 in accordance with at least one embodiment. In the environment 400, the delivery verification service 404 may transmit executable instructions to an unmanned vehicle 402 or to an entity that can program the unmanned vehicle 402 to cause the unmanned vehicle 402 to deliver an authentication device 412 to an intended recipient 406. For instance, the delivery verification service 404 or the organization that is sending the authentication device 412 to the recipient 406 may provide Global Positioning System (GPS) coordinates or other information for identifying a physical location of where the recipient 406 may be at the time of delivery of the authentication device 412. The estimated physical location for delivery may include the aforementioned GPS coordinates, landmarks, specific terrain features (e.g., named lakes, rivers, mountains, valleys, etc.), distances from known landmarks or specific terrain features, and the like.

In an embodiment, the delivery verification service 404 or the organization sending the authentication device 412 may provide the recipient 406 with information usable to access a local communications network that is to be provided through an unmanned vehicle 402. For instance, the delivery verification service 404 or organization may provide the recipient 406 with a Service Set Identifier (SSID) for the local communications network that is to be provided through the unmanned vehicle 402, where an unmanned vehicle is a vehicle that is able to travel to a specified destination autonomously (e.g., without human intervention after dispatch). Alternatively, the information usable to access the local communications network may include one or more cryptographic keys of cryptographic key pairs, which may be provided to the unmanned vehicle 402 in order to access the network. Unmanned vehicles do not necessarily fly and include, but are not limited to, land-based vehicles (e.g., cars, trucks, and other automobiles), rail-based vehicles (e.g., trains), aqueous vehicles (e.g., boats and submarines), different types of air vehicles (helicopters, airplanes, and the like), and/or other types of vehicles. Note that unmanned vehicles, in some implementations, may have a human operator for at least some operation and/or for overriding of automated systems. For instance, a passenger vehicle may be considered an unmanned vehicle even though a passenger may be able to override automated controls. The local communications network enables the unmanned vehicle 402 to better determine the recipient's precise location in order to ensure proper delivery of the authentication device 412.

In an embodiment, the delivery verification service 404 will transmit a request to the recipient 406 to provide additional authentication information that may be used by the unmanned vehicles 402 to identify the recipient 406 or other entity authorized to receive the authentication device 412 upon arriving at the recipient's location. For example, a recipient 406 may utilize the camera of its mobile device to capture an image of the recipient 406 or an authorized third-party recipient. The mobile device may transmit this image to the delivery verification service 404, which may utilize the image for facial recognition analyses using the recipient's or other authorized third-party recipient's facial features (e.g., hair color, eye color, facial geometry, etc.). The delivery verification service 404, in response to obtaining the authentication information from the recipient 406 and providing the information usable to access the local communications network to be utilized to establish a connection between the unmanned vehicle 402 and the recipient 406, the delivery verification service 404 may configure the unmanned vehicle 402 to launch the local communications network using an SSID. Further, the delivery verification service 404 may configure the unmanned vehicle 402 to travel to the location specified by the recipient 406. The unmanned vehicle 402 may also be provided with the expected authentication information that is to be obtained from the recipient 406 upon arriving at the recipient's location in order to determine whether the delivery of the authentication device 412 may be made. For instance, if the recipient 406 provided a photographic image of the recipient 406 or other authorized third-party recipient, the unmanned vehicle 402 may obtain a photographic image of the recipient 406 or other authorized third-party recipient upon arriving at the location in order to identify the intended recipient and ensure delivery is made to the correct recipient. In some embodiments, the unmanned vehicle utilizes one or more sensors associated with the unmanned vehicle 402 to capture authentication information of the recipient. For instance, the unmanned vehicle 402 may include a camera, which can be used to capture an image of the recipient 406.

In some embodiments, the unmanned vehicle 402 generates a delivery notification 408 that it may transmit, along with the authentication information provided by the recipient 406, to the delivery verification service 404. The delivery verification service 404 may evaluate the delivery notification 408 and the authentication information obtained from the unmanned vehicle 402 to determine whether the authentication device 412 was delivered to the intended recipient or to an authorized third-party recipient. If so, the delivery verification service 404 may transmit a notification to the device management service 410 to indicate that the authentication device 412 may be activated. Thus, if the recipient 406 changes the state of the authentication device 412 to enable the authentication device 412 to send signals to and receive signals from the device management service 410, the authentication device 412 may submit a signal to the device management service 410 to receive an activation signal 414. If the device management service 410 determines, based at least in part on the notification from the delivery verification service 404 that the authentication device 412 can be activated, the device management service 410 may transmit the activation signal 414 to the authentication device 412.

In an alternative embodiment, the unmanned vehicle 402 utilizes a secure communications channel established between the unmanned vehicle 402 and the device management service 410 to indicate successful delivery of the authentication device 412 to the recipient 406. If the unmanned vehicle 402 is dispatched by the delivery verification service 404 or an entity that provides the delivery verification service 404, the unmanned vehicle 402 may verify that the authentication device 412 was delivered to the recipient 406 and transmit a notification to the device management service 410 to activate the authentication device 412. For instance, in order to ensure that the intended recipient 406 receives the authentication device 412, the recipient 406 may provide a photographic image of the recipient 406, other biometric information (e.g., fingerprint, retinal scan, etc.), or credential information (e.g., username/password, cryptographic key, etc.) to the unmanned vehicle 402. The unmanned vehicle 402 may be configured to verify that the provided information corresponds to the intended recipient 406 of the authentication device 412 prior to releasing the authentication device 412 to the recipient 406. In some embodiments, if the unmanned vehicle 402 verifies that the provided information corresponds to the intended recipient 406, the unmanned vehicle 402 configures the authentication device 412 with a shared secret or other information to enable the authentication device 412 to generate one-time passwords or other authentication information. Thus, the unmanned vehicle 402 may provide the recipient with an activated authentication device that can be used for authentication purposes.

However, if the delivery verification service 404 determines that the unmanned vehicle 402 has delivered the authentication device 412 to an unauthorized entity or that the unmanned vehicle 402 was unable to successfully deliver the authentication device 412 (e.g., the unmanned vehicle 402 is lost during delivery, no recipients were available to receive the authentication device 412, etc.), the delivery verification service 404 may transmit a notification to the device management service 410 indicating that the authentication device 412 cannot be activated. This may cause the device management service 410 to transmit a signal to the authentication device 412 that may cause the authentication device 412 to become disabled or deactivated, preventing use of the authentication device 412 by anyone.

Figure 5:
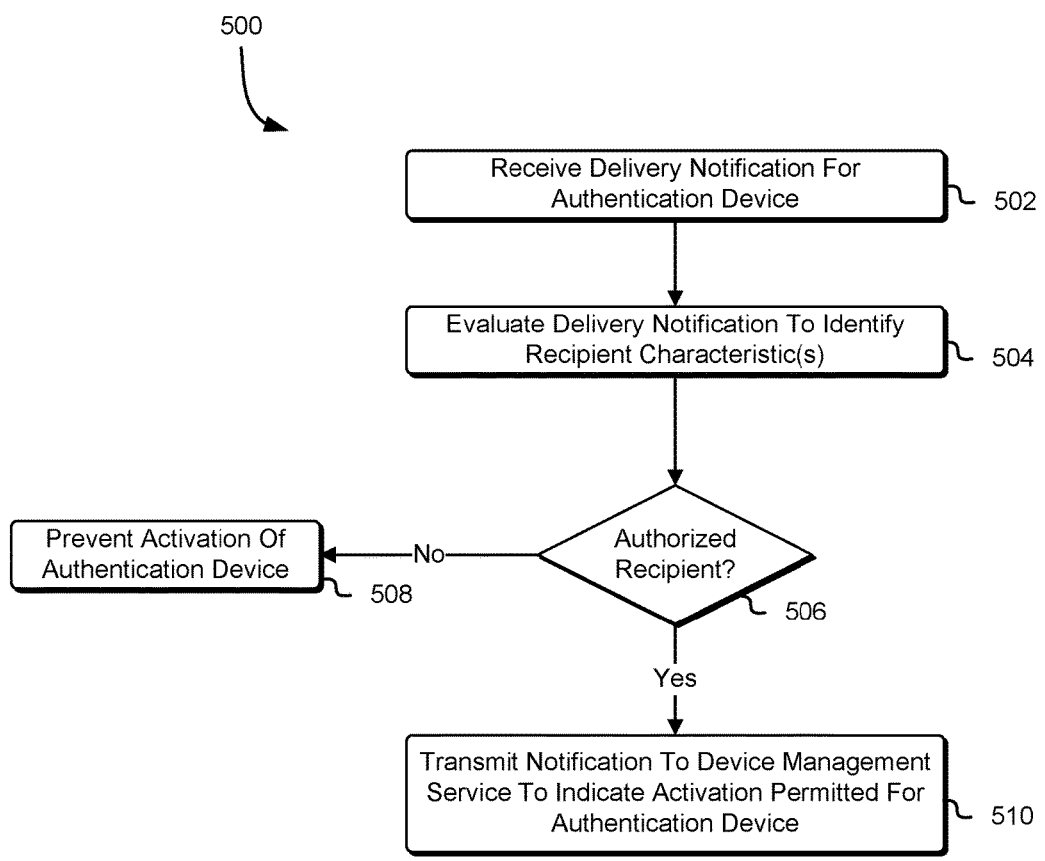
FIG. 5 shows an illustrative example of a process for transmitting a notification to a device management service for activation of an authentication device in response to receiving a delivery notification for the authentication device in accordance with at least one embodiment.

As noted above, a delivery verification service may utilize delivery notifications from delivery couriers dispatched to deliver authentication devices to designated recipients to determine whether these authentication devices have been delivered successfully to the designated recipients. For instance, the delivery verification service may obtain, from a delivery notification, information regarding the recipient of an authentication device to determine whether the recipient was authorized to receive the authentication device. If the authentication device is delivered to an unauthorized entity, the delivery verification service may perform various actions to ensure that the unauthorized entity cannot utilize the authentication device to access an organization's resources and services. Accordingly, FIG. 5 shows an illustrative example of a process 500 for transmitting a notification to a device management service for activation of an authentication device in response to receiving a delivery notification for the authentication device in accordance with at least one embodiment. The process 500 may be performed by the aforementioned delivery verification service, which may receive delivery notifications from delivery couriers and provide notifications to a device management service for activation of authentication devices.

A delivery courier may deliver, on behalf of an organization that relies on multi-factor authentication or other authentication schemes, an authentication device that can be used by a recipient to access one or more services and resources of the organization. The delivery courier may generate, at the point of delivery, a delivery notification that may specify the date and time of delivery, the name of the recipient that received the deliver, a signature of the recipient, biometric information of the recipient, and the like. The delivery courier may transmit the delivery notification to the delivery verification service, which may receive 502 the delivery notification for the authentication device delivered to a recipient.

In response to receiving the delivery notification from the delivery courier, the delivery verification service may evaluate 504 the delivery notification to identify one or more characteristics of the recipient that received the authentication device. For instance, the delivery verification service may utilize an image of the recipient for facial recognition analyses using the recipient's facial features (e.g., hair color, eye color, facial geometry, etc.). The delivery verification service may use one or more facial recognition analyses to generate one or more facial recognition vectors usable to identify the recipient. The delivery verification service may utilize the one or more facial recognition analyses to convert the images into vectors. These vectors may be analyzed against the known facial recognition vectors for the recipient. If the delivery notification includes a signature of the recipient, the delivery verification service may utilize one or more handwriting recognition analyses to generate one or more handwriting recognition vectors usable to identify the recipient. The delivery verification service may also evaluate the delivery notification to discern the address to which the authentication device was delivered and the like.

The delivery verification service may utilize the characteristics of the recipient garnered from the delivery notification to determine 506 whether the recipient of the authentication device is authorized to receive the authentication device. For instance, the delivery verification service may evaluate the facial recognition vectors generated using an image of the recipient in the delivery notification against the known facial recognition vectors for the intended recipient to determine whether the image is of the intended recipient. Similarly, the delivery verification service may compare a signature provided in the delivery notification against the intended recipient's known signature to determine whether the signature in the delivery notification corresponds to the intended recipient. The delivery verification service may also evaluate other information specified in the delivery notification to determine whether the authentication device was delivered to an authorized recipient. For instance, if the authentication device was delivered to an address that is different from the one or more addresses on record for the authorized recipient, the delivery verification service may determine that the authentication device was not delivered to the authorized recipient.

If the delivery verification service determines that the authentication device was not delivered to an authorized recipient, the delivery verification service may perform a workflow to prevent 508 activation of the authentication device. For instance, the delivery verification service may transmit a notification to a device management service to cause the device management service to transmit a disabling signal to the authentication device. In response to receiving the disabling signal from the device management service, the authentication device may become disabled, thus preventing unauthorized use of the authentication device. As another example, the delivery verification service may transmit a request to the delivery courier or to the delivery service that dispatched the delivery courier to retrieve the authentication device from the unauthorized recipient that received the authentication device. The delivery verification service may also notify the authorized recipient that the authentication device has been delivered to an unauthorized entity and that it has been disabled. This may enable the authorized recipient to notify the organization to request a new authentication device.

If the delivery verification service determines that the authentication device was delivered to an authorized recipient, the delivery verification service may transmit 510 a notification to a device management service to indicate that activation of the authentication device is permitted. This may cause the device management service to transmit an activation signal to the authentication device. In response to receiving the activation signal from the device management service, the authentication device may generate and display one-time passwords or other authentication information that the recipient may provide to the organization to access its services and resources. Alternatively, if the authentication device is delivered in a state whereby it cannot receive signals from the authentication device, the device management service may store the notification and access it in response to a request from the recipient or from the authentication device itself to activate the authentication device.

Figure 6:
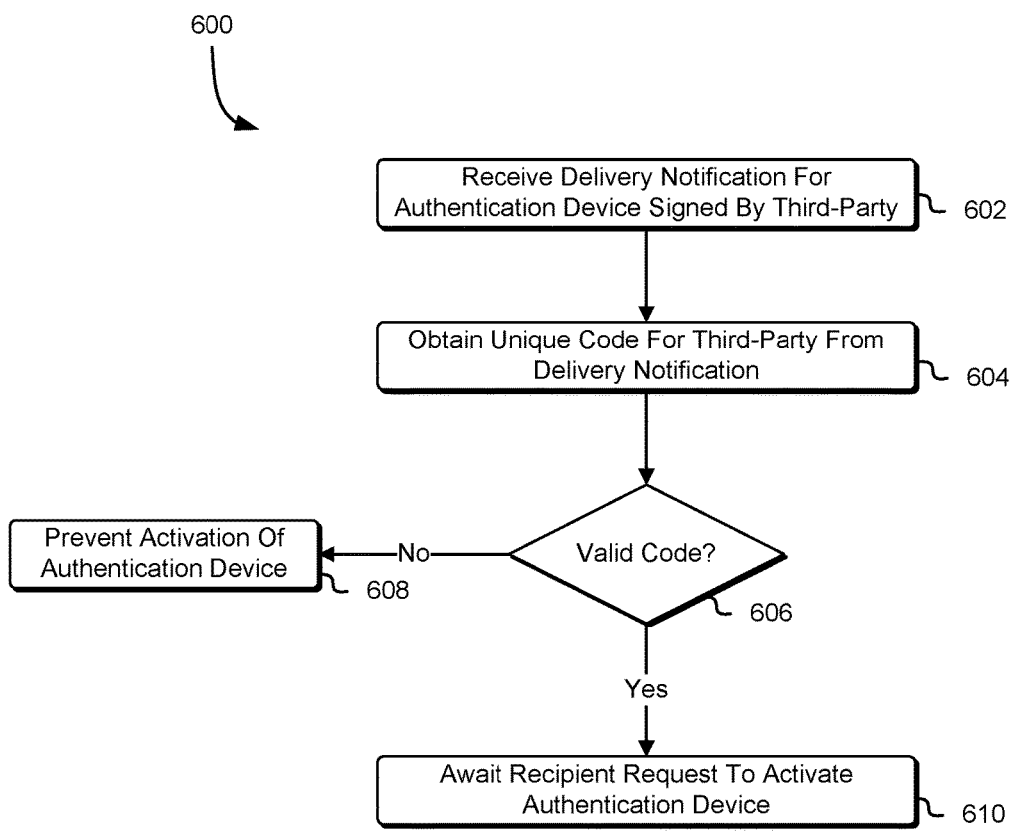
FIG. 6 shows an illustrative example of a process for evaluating an incoming delivery notification signed by a third-party to determine whether the third-party is authorized to receive the authentication device on behalf of an intended recipient in accordance with at least one embodiment.

As noted above, an intended recipient of an authentication device may designate one or more third-party recipients that may be authorized to receive the authentication device on the intended recipient's behalf. In some embodiments, the intended recipient provides each designated third-party recipient with a unique code that can be used to identify the third-party recipient and to authenticate the third-party recipient. These unique codes may be provided to the delivery verification service, which may use these unique codes to determine whether the third-party is authorized to receive the authentication device on behalf of the intended recipient. Accordingly, FIG. 6 shows an illustrative example of a process 600 for evaluating an incoming delivery notification signed by a third-party to determine whether the third-party is authorized to receive the authentication device on behalf of an intended recipient in accordance with at least one embodiment. The process 600 may be performed by the aforementioned delivery verification service, which may evaluate incoming delivery notifications from various delivery couriers to determine whether delivery of authentication devices is performed successfully and to authorized recipients.

As described above, a delivery courier may deliver, on behalf of an organization, an authentication device that can be used by a recipient to access one or more services and resources of the organization. The delivery courier may generate, at the point of delivery, a delivery notification that may specify the date and time of delivery, the name of the recipient that received the deliver, a signature of the recipient, biometric information of the recipient, and the like. In an embodiment, the delivery courier delivers the authentication device to a third-party recipient. For instance, the intended recipient may reside in a community wherein a manager of the community may receive deliveries on behalf of the residents of the community. Alternatively, the delivery courier may deliver the authentication device to a relative of the intended recipient, which may reside with the intended recipient at the provided address. The delivery courier may transmit the delivery notification to the delivery verification service, which may receive 602 the delivery notification for the authentication device delivered to a third-party recipient.

In response to receiving the delivery notification from the delivery courier, the delivery verification service may obtain 604 the unique code for the third-party from the delivery notification. For instance, the third-party recipient may provide a unique code provided by the intended recipient to the delivery courier as part of the delivery of the authentication device. The delivery courier may include this unique code in the delivery notification provided to the delivery verification service. The intended recipient, as part of a registration process for obtaining the authentication device, may provide the unique code to the delivery verification service. The delivery verification service may store this unique code in a datastore for use in verifying third-party recipients of authentication devices, along with other characteristics of the third-party recipient that is provided with the unique code.

The delivery verification service may evaluate the unique code from the delivery notification to determine 606 whether the provided unique code is valid. For instance, the delivery verification service may compare the received unique code from the delivery notification to the unique code specified by the intended recipient as part of the registration process and corresponding to the identified third-party recipient. If the unique code provided in the delivery notification does not match the unique code that corresponds to the third-party recipient or if the third-party recipient did not provide a unique code to the delivery courier, the delivery verification service may prevent 608 activation of the authentication device. This may include transmitting a notification to a device management service to cause the device management service to transmit a disabling signal to the authentication device. As another example, the delivery verification service may transmit a request to the delivery courier or to the delivery service that dispatched the delivery courier to retrieve the authentication device from the unauthorized recipient that received the authentication device. The delivery verification service may also notify the authorized recipient that the authentication device has been delivered to an unauthorized entity and that it has been disabled. This may enable the authorized recipient to notify the organization to request a new authentication device.

If the delivery verification service determines that the unique code specified in the delivery notification is valid for the identified third-party recipient, the delivery verification service may await 610 a request from the intended recipient to activate the authentication device. In some embodiments, the delivery verification service defines an authentication period during which the authentication device may be activated. For instance, as will be described in greater detail below, if the intended recipient submits a request to activate the authentication device during the activation period, the delivery verification service may transmit a notification to the device management service to cause the device management service to activate the authentication device. However, if the activation period has elapsed, the delivery verification service may prevent the activation of the authentication device.

Figure 7:
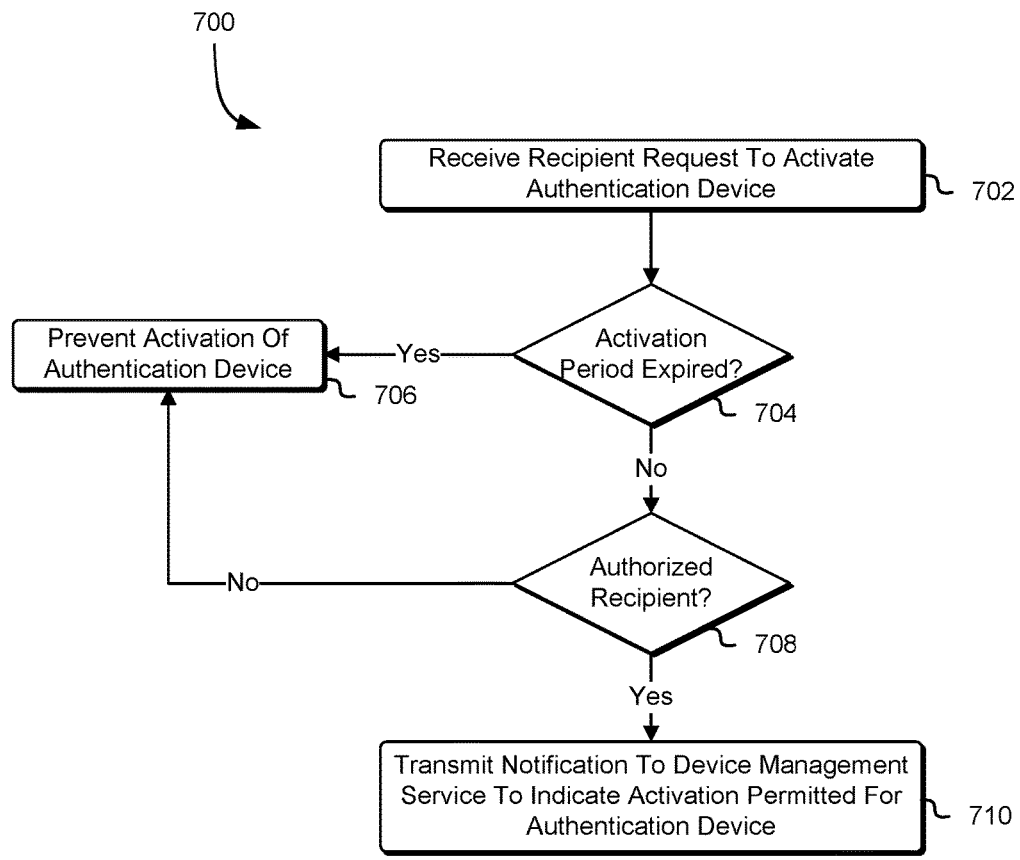
FIG. 7 shows an illustrative example of a process for transmitting a notification to a device management service for activation of an authentication device in response to receiving a request from a recipient to activate the authentication device in accordance with at least one embodiment.

FIG. 7 shows an illustrative example of a process 700 for transmitting a notification to a device management service for activation of an authentication device in response to receiving a request from a recipient to activate the authentication device in accordance with at least one embodiment. The process 700 may be performed by a delivery verification service, which may process incoming requests from recipients of authentication devices to activate these authentication devices. Further, the delivery verification service may communicate with a device management service to cause the device management service to either transmit activation signals to authentication devices or to disable authentication devices based at least in part on the processing of the requests from the recipients of the authentication devices.

At any time, the delivery verification service may receive 702 a request from a recipient of an authentication device to active the authentication device. The recipient may provide credential information for authentication to the delivery verification service, as well as an identifier for the authentication device received by the recipient from the delivery courier. The credential information may include, among other things, a username, a corresponding password, biometric information, a cryptographic key, a unique identifier, a set of credentials, a hash of the set of credentials, a digital signature generated using a credential, a message authentication code generated based at least in part on a credential, and the like.

In response to the request, the delivery verification service may determine 704 whether the activation period for the specified authentication device has expired. For instance, the delivery verification service may utilize the specified identifier for the authentication device to identify the activation period for the authentication device. If the activation period for the authentication device has expired, the delivery verification service may deny the recipient's request to activate the authentication device. Additionally, the delivery verification service may prevent 706 activation of the authentication device. For instance, the delivery verification service may transmit a notification to a device management service to cause the device management service to transmit a disabling signal to the authentication device. In response to receiving the disabling signal from the device management service, the authentication device may become disabled, thus preventing unauthorized use of the authentication device.

If the activation period for the authentication device has not expired, the delivery verification may determine 708 whether the recipient making the request to activate the authentication device is authorized to utilize the authentication device. For instance, the delivery verification service may utilize the provided credential information from the recipient to authenticate the recipient and to identify any policies applicable to the request that may be used to denote whether the recipient is authorized to utilize the specified authentication device. Additionally, the delivery verification service may determine whether the authentication device has been assigned to the recipient. If the delivery verification service determines that the recipient is not an authorized recipient of the authentication device, the delivery verification service may prevent 706 activation of the authentication device using the methods described above.

If the activation period has not expired and the recipient is deemed to be an authorized recipient of the authentication device, the delivery verification service may transmit 710 a notification to the device management service to indicate that activation of the authentication is permitted. This may cause the device management service to transmit an activation signal to the authentication device. In response to receiving the activation signal from the device management service, the authentication device may generate and display one-time passwords or other authentication information that the recipient may provide to the organization to access its services and resources. Alternatively, if the authentication device is delivered in a state whereby it cannot receive signals from the authentication device, the device management service may store the notification and access it in response to a request from the recipient or from the authentication device itself to activate the authentication device.

Figure 8:
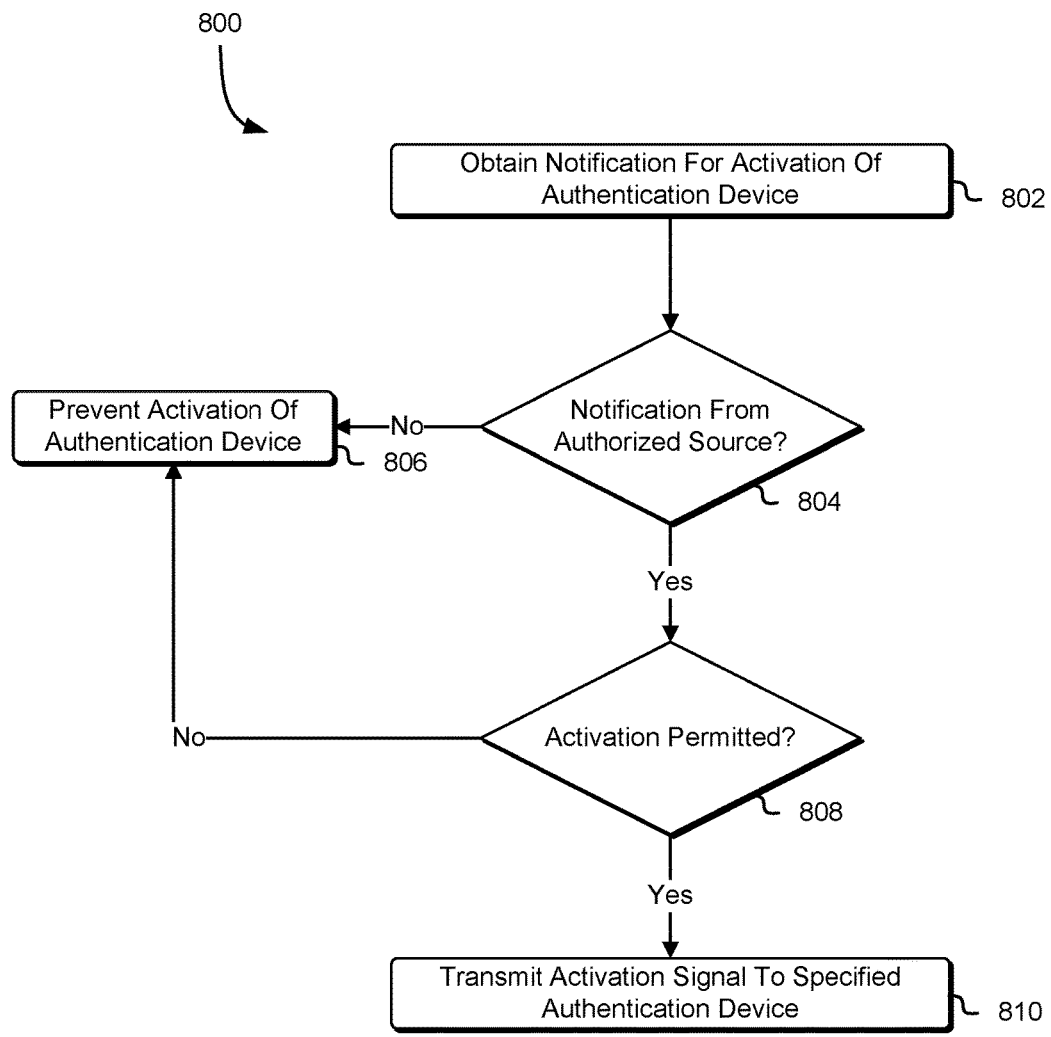
FIG. 8 shows an illustrative example of a process for transmitting an activation signal to an authentication device in response to a notification from a delivery verification service in accordance with at least one embodiment.

As noted above, a device management service may receive a notification from a delivery verification service indicating whether activation of an authentication device is permitted. If the notification specifies that an authentication device may be activated, the device management service may await a request from the authentication device to receive an activation signal for activation of the authentication device for use in accessing services and resources of the organization that provided the authentication device to the recipient. Accordingly, FIG. 8 shows an illustrative example of a process 800 for transmitting an activation signal to an authentication device in response to a notification from a delivery verification service in accordance with at least one embodiment. The process 800 may be performed by the aforementioned device management service, which may process incoming notifications from the delivery verification service and, based at least in part on these notifications, determine whether to transmit signals to authentication devices for activation of these authentication devices.

At any time, the device management service may obtain 802 a notification from a delivery verification service or other entity for activation of an authentication device. The notification may specify an identifier for the authentication device, as well as instructions indicating the signal to be transmitted to the authentication device based at least in part on an evaluation of a delivery notification by the delivery verification service. The notification may include credential information or other information that may be used by the device management service to authenticate the sender of the notification. The device management service may receive the notification from the delivery management service or may query the delivery management service to determine whether a particular authentication device may be activated.

In response to receiving the notification, the device management service may evaluate the notification to determine 804 whether the notification is from an authorized source, such as the delivery verification service. For instance, the device management service may evaluate the credential information or other information specified in the notification to determine whether the notification originated from the delivery verification service. If the notification is not from an authorized source, the device management service may prevent 806 activation of the specified authentication device. This may include transmitting a signal to the authentication device that may cause the authentication device to become disabled and rendered unusable for authentication.

If the notification is from an authorized source, the device management service may determine 808 whether activation of the specified authentication device is permitted. As described above, the delivery verification service may transmit a notification to the device management service to indicate that activation of the authentication is permitted. Alternatively, if the delivery verification service determines that the authentication device cannot be activated, the delivery verification service may specify, in the notification, that the device management service is to disable the authentication device or otherwise prevent the authentication device from being used to access the resources and services of the organization. Thus, if the device management service determines that the notification does not permit activation of the authentication device, the device management service may prevent 806 activation of the authentication device. Alternatively, if the notification specifies that activation of the authentication device is permitted, the device management service may transmit 810 an activation signal to the specified authentication device to cause the authentication device to become activated. In some embodiments, the device management service will await a signal or request from the authentication device prior to transmitting the activation signal to the specified authentication device.

In some embodiments, if the authentication device is configured without any communications components (e.g., cannot transmit or receive signals), the device management service activates the authentication device itself such that the authentication device is associated with the recipient and can be used by the recipient for authentication purposes. For instance, the device management service may maintain a database of activated authentication devices. Within this database, the device management service may add an identifier for the authentication device and associate this identifier with the recipient. Further, the device management service 114 may maintain information that enables it to verify authentication attempts made using one-time passwords or other codes generated by the authentication device. This enables the device management service to calculate the expected one-time password for authentication of the recipient if the recipient provides a one-time password purportedly generated by the authentication device. In some embodiments, if the device management service registers an authentication device as being activated for use by the recipient, the device management service identifies other authentication devices utilized by the recipient and deactivates these other authentication devices. Thus, the authentication device and no other older authentication device may be used by the recipient for authentication purposes.

Figure 9:
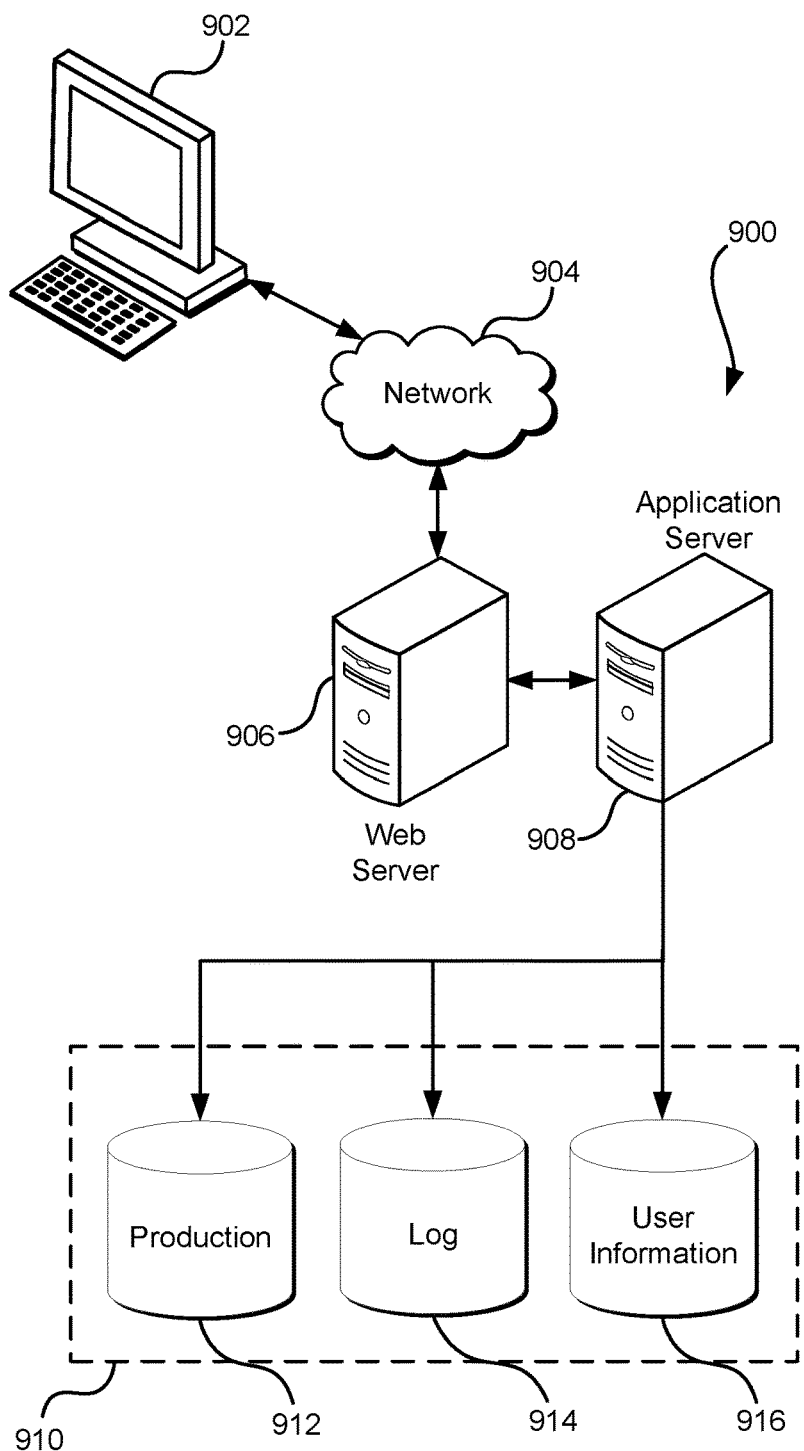
FIG. 9 shows an illustrative example of an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a datastore 910. It should be understood that there can be several application servers, layers, or other elements, processes, or components, which may be chained or otherwise configured, which can interact to perform tasks such as obtaining data from an appropriate datastore. Servers, as used herein, may be implemented in various ways, such as hardware devices or virtual computer systems. In some contexts, servers may refer to a programming module being executed on a computer system. As used herein, unless otherwise stated or clear from context, the term "datastore" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the datastore as needed to execute aspects of one or more applications for the client device, handling some or all of the data access and business logic for an application. The application server may provide access control services in cooperation with the datastore and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The datastore 910 can include several separate data tables, databases, data documents, dynamic data storage schemes, and/or other data storage mechanisms and media for storing data relating to a particular aspect of the present disclosure. For example, the datastore illustrated may include mechanisms for storing production data 912 and user information 916, which can be used to serve content for the production side. The datastore also is shown to include a mechanism for storing log data 914, which can be used for reporting, analysis, or other such purposes. It should be understood that there can be many other aspects that may need to be stored in the datastore, such as page image information and access rights information, which can be stored in any of the above listed mechanisms as appropriate or in additional mechanisms in the datastore 910. The datastore 910 is operable, through logic associated therewith, to receive instructions from the application server 908 and obtain, update, or otherwise process data in response thereto. The application server 908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the datastore might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM®, as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of datastores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving an electronic message, from a computing device of an entity tasked with delivering an authentication device to a physical location, that indicates delivery of the authentication device to the physical location, the authentication device delivered in a deactivated state;
   evaluating the electronic message to identify a set of attributes of a recipient to which the authentication device was delivered at the physical location;
   determining, based at least in part on the set of attributes, to activate the authentication device; and
   causing the authentication device to be activated.

2. The computer-implemented method of claim 1, further comprising:
   receiving a second electronic message that indicates delivery of a second authentication device to a second physical location;
   evaluating the second electronic message to identify a second set of attributes of a second recipient to which the second authentication device was delivered at the second physical location;
   determining, based at least in part on the second set of attributes, that the second recipient is not authorized to utilize the second authentication device; and
   preventing activation of the second authentication device.

3. The computer-implemented method of claim 1, wherein:
   the set of attributes include biometric information of the recipient; and
   determining to activate the authentication device includes evaluating the biometric information to determine that the biometric information corresponds to an authorized user of the authentication device.

4. The computer-implemented method of claim 1, wherein:
   the set of attributes include a code provided by an authorized user of the authentication device; and
   determining to activate the authentication device includes evaluating the code to determine that the code is valid.

5. A system, comprising at least one computing device configured to implement one or more services, wherein the one or more services are configured to:
   identify, based at least in part on an electronic message that indicates delivery of an authentication device, a set of attributes of a recipient to which the authentication device was delivered, where the electronic message is obtained from a courier responsible for delivering the authentication device;
   determine, based at least in part on the set of attributes, to activate the authentication device; and
   cause the authentication device to be activated.

6. The system of claim 5, wherein:
   the set of attributes include one or more handwriting recognition vectors generated based at least in part on a signature provided by the recipient of the authentication device; and
   a determination to activate the authentication device is made as a result of a determination that the one or more handwriting recognition vectors correspond to an authorized user of the authentication device.

7. The system of claim 5, wherein the one or more services are further configured to transmit a notification to a device management service to indicate that activation of the authentication device is permitted to cause the authentication device to be enabled.

8. The system of claim 5, wherein:
   the electronic message is generated by a computing device of a physical storage location to which the authentication device was delivered; and
   the electronic message specifies biometric information of the recipient obtained by the computing device of the physical storage location and a code used to access the physical storage location.

9. The system of claim 5, wherein:
   the set of attributes include a code; and
   the one or more services are further configured to determine to activate the authentication device as a result of the code corresponding to a second code provided by an authorized user of the authentication device.

10. The system of claim 5, wherein the electronic message is generated by an unmanned vehicle in response to delivering the authentication device to a physical location and determining, based at least in part on authentication information of the recipient of the authentication device captured via sensors associated with the unmanned vehicle, that the recipient is authorized to receive the authentication device.

11. The system of claim 5, wherein the one or more services are further configured to transmit a request to a device management service to transmit an activation signal to the authentication device to cause the authentication device to be enabled.

12. The system of claim 5, wherein:
the set of attributes include a time at which the authentication device was delivered; and
the one or more services are further configured to determine to activate the authentication device as a result of a determination, based at least in part on the time, that an activation period for the authentication device has not elapsed.

13. A non-transitory computer-readable storage medium having stored thereon executable instructions that, as a result of being executed by one or more processors of a computer system, cause the computer system to at least:
evaluate, in response to obtaining an electronic message that indicates delivery of a device that can be authenticated, the electronic message to identify a set of attributes of a recipient of the device, where the electronic message is received from a computing device of a delivery courier tasked with delivering the device to a physical location;
determine, based at least in part on the set of attributes, that the device can be activated; and
enable activation of the device.

14. The non-transitory computer-readable storage medium of claim 13, wherein the instructions that cause the computer system to enable activation of the device further cause the computer system to transmit a request to a device management service to cause the device management service to transmit an activation signal to the device.

15. The non-transitory computer-readable storage medium of claim 13, wherein the instructions that cause the computer system to enable activation of the device further cause the computer system to transmit a notification to a device management service to indicate that activation of the device is permitted in response to a signal from the device.

16. The non-transitory computer-readable storage medium of claim 13, wherein the instructions further cause the computer system to disable other devices that can be authenticated and utilized by the recipient in response to an indication that the device has been activated.

17. The non-transitory computer-readable storage medium of claim 13, wherein the instructions further cause the computer system to:
evaluate, in response to receiving a second electronic message that indicates delivery of a second device, the second electronic message to identify a second set of attributes of a second recipient of the second device;
determine, based at least in part on the set of attributes, that the recipient of the second device was not authorized to receive the second device; and
initiate an activation period for the second device to enable an authorized user of the second device to submit a request to activate the second device during the activation period.

18. The non-transitory computer-readable storage medium of claim 13, wherein:
the set of attributes include biometric information of the recipient; and
the instructions that cause the computer system to determine that the device can be activated further cause the computer system to evaluate the biometric information to determine that the biometric information corresponds to an authorized user of the device.

19. The non-transitory computer-readable storage medium of claim 13, wherein:
the set of attributes include a code provided by the recipient; and
the instructions that cause the computer system to determine that the device can be activated further cause the computer system to determine that the code provided by the recipient corresponds to the code provided by an authorized user of the device.

20. The non-transitory computer-readable storage medium of claim 13, wherein:
the set of attributes include credential information obtained from the recipient; and
the instructions that cause the computer system to determine that the device can be activated further cause the computer system to evaluate the credential information to determine that the credential information corresponds to an authorized user of the device.

* * * * *